May 7, 1963  A. MOLS  3,088,298
PROCESS FOR THE CONTINUOUS MANUFACTURE OF REINFORCED CAST GLASS
Filed Aug. 11, 1959  2 Sheets-Sheet 1

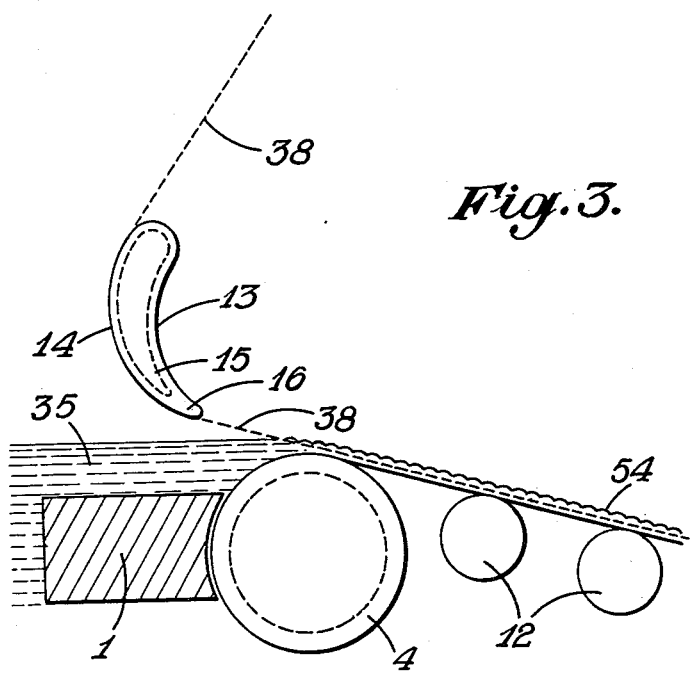
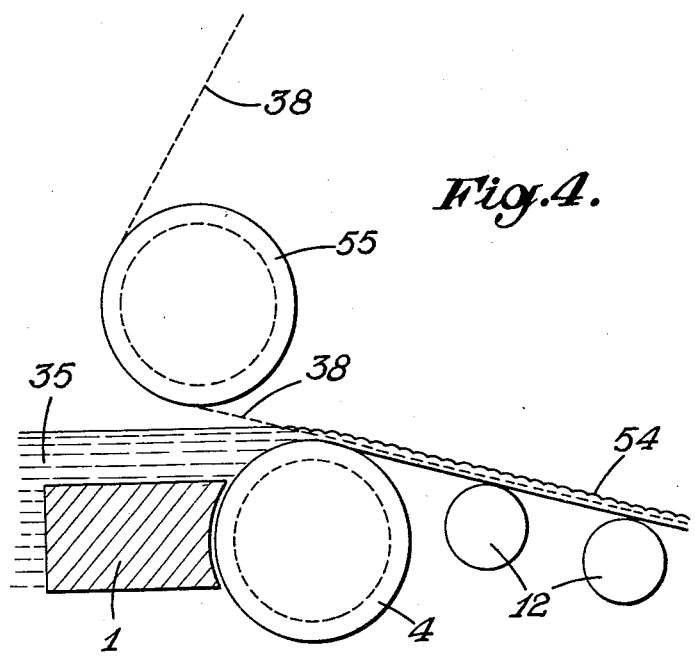

United States Patent Office 3,088,298
Patented May 7, 1963

3,088,298
PROCESS FOR THE CONTINUOUS MANUFACTURE OF REINFORCED CAST GLASS
Adolphe Mols, Zevergem, Belgium, assignor to Les Glaceries de la Sambre, Societe Anonyme, Auvelais, Belgium, a Belgian company
Filed Aug. 11, 1959, Ser. No. 832,991
Claims priority, application Belgium Aug. 22, 1958
3 Claims. (Cl. 65—44)

The present invention relates to processes for the continuous production of reinforced cast glass and to apparatus for carrying out such processes.

In known processes for the continuous production of reinforced cast glass, a continuous sheet of molten glass overflows a wall of a tank furnace and is rolled between two rollers. A wire or netting, constituting a reinforcement for the glass, is introduced into the glass sheet upstream of the rollers with the aid of an auxiliary roller or of a pocket acting as a guide for the reinforcement. A plane reinforced cast glass is thus obtained.

It is an object of the invention to improve the known processes for the continuous production of reinforced cast glass and to improve the product produced thereby.

In contrast to the known processes, in the present invention the continuous reinforced cast glass ribbon is driven, in the course of its formation, solely by a roller which is combined with the lower lip of the overflow and by the traction of the reinforcement which commences to act at a sufficiently solidified point of the reinforced cast glass ribbon traveling over the conveyor rollers.

The process according to the invention affords inter alia an important double advantage, namely:

It renders substantially invisible the metal reinforcement, which generally consists of a wire netting, and It imparts to the reinforced cast glass sheet a novel surface consisting of a multitude of small abutting or contiguous plano-convex lenses, otherwise known as a lenticular surface.

The invention will become more apparent by considering the devices adapted for carrying out the processes as shown in the accompanying diagrammatic drawings, which are given merely by way of example, and in which:

FIGURE 3 is a vertical longitudinal section through a second embodiment of the invention; and FIGURE 4 is a vertical longitudinal section through a third embodiment of the invention.

Figure 1:
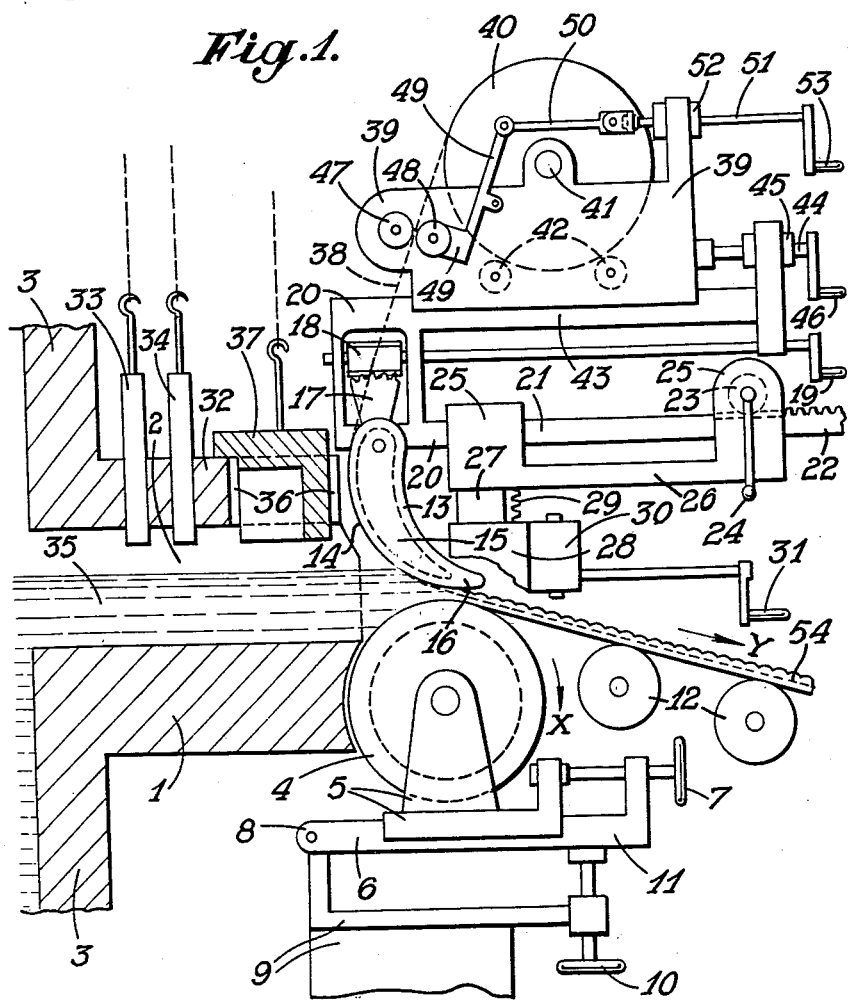
FIGURE 1 is a vertical longitudinal section through an apparatus constituting a first embodiment of the invention.

According to FIGURE 1, the sill or lower lip 1 of the overflow 2 of a tank furnace 3 is combined in a manner known per se with a water-cooled lower roller 4 which is situated at a slightly higher level than the sill or lower lip 1 and which is actuated at an adjustable speed of rotation in a manner known per se in the direction of the arrow x by a drive (not shown).

In addition, in the embodiment illustrated in FIGURE 1, the lower roller 4 is mounted on a support 5 resting on slides 6 in such manner that it can be moved towards and away from the lower lip 1 of the overflow 2 by a control screw 7, the slides 6 being angularly adjustable in a vertical plane about end 8 which is pivotally connected to a fixed support 9 provided with a vertical control screw 10 supporting the end 11 of the slides 6.

The lower roller 4 is followed by known supporting rollers 12 (of which only two are shown in the drawing), these rollers which precede an unillustrated lehr, as well as conveyor rollers (no shown) situated in the lehr, are actuated in a manner known per se by a variable speed rotary drive.

Mounted above the lower roller 4 is a tubular member 13, known as a pocket, having a water-cooled guide face 14, of a type also known per se, which in transverse section has a curved profile, of which a narrowed portion 15 and the end portion 16 are directed towards the lower roller 4 and in the direction Y of travel of the glass ribbon, respectively.

In the embodiment in FIGURE 1, the pocket 13 is mounted in such manner as to be angularly adjustable by means of a toothed sector drive 17, a worm 18 and a crank 19, supported on a support 20. The support includes slides 21 provided with racks 22 acted on by pinions 23 coupled to cranks 24. The slides 21 are adapted to slide horizontally in a support 25, 26, 27 which is vertically displaceable in a fixed support 28, for example by means of a drive comprising a rack 29, a screw 30 and a crank 31.

The pocket 13 is thus angularly, longitudinally and vertically adjustable relative to the lower roller 4 and the upper lip 32 of the overflow 2, which upper lip 32 may be provided in a manner known per se with vertically movable gates 33, 34 for the adjustment of the overflow level of the stream of molten glass 35 downstream of the said gates.

In addition, the upper lip 32 of the overflow 2 may be formed at its outer end with a recess 36 adapted to be closed to a variable extent by removable screening members 37 of differing depths and widths, it being possible by suitably replacing the screening members to adjust the magnitude of the thermal radiations to which the guide face 14 of the pocket 13 is exposed and consequently the reinforcement 38 passing over this guide face before entering the molten glass.

Moreover, in the embodiment under consideration, the reinforcement 38, generally consisting of wire netting having meshes of any desired polygonal, curved or boxed form, arrives onto the guide face 14 of the member 13, the said reinforcement coming from a roll 40 supported in the carriage 39. The roll 40 is supported on a central support 41 and, if desired, peripheral rollers 42 mounted in the carriage 39, the latter being adapted to slide on the upper part 43 of the support 20. Moreover, the carriage 39 is displaceable by a control system comprising a screw 44, a nut 45 and a crank 46.

The reinforcement 38 advantageously passes between two guide rollers 47 and 48 mounted in the carriage 39, the roller 48 being displaceable towards the roller 47 in such manner that the reinforcement 38 can be gripped and braked in adjustable fashion between the said rollers 47, 48. The displaceable roller 48 is supported on a shoe 49 which is pivotally mounted in the carriage 39 and is adapted to be actuated by means of a control system comprising a connecting rod 50, a screw 51, a nut 52 and a crank 53.

It will be seen from the foregoing that, in contrast to known installations, the apparatus employed for carrying out the process according to the present invention lacks a roller above the lower roller 4, and utilizes only the pocket 13, 14, for guiding the reinforcement 38.

The position of the member 13, 14 above the lower roller 4 causes the reinforcement 38 to travel around the guide face 14 of the pocket 13, between the lower roller 4 and the portions 15, 16 of the pocket 13, and into the mass of glass 35 coming from the furnace 3.

Owing to its contact with the water-cooled roller 4 and with the portions 15, 16 of the water-cooled pocket 13, 14, the mass of glass containing the reinforcement 38 undergoes a rapid solidification in the form of a ribbon of reinforced cast glass 54, which is driven, first by the supporting rollers 12 and then by the conveyor rollers (not shown) in the associated lehr.

The reinforcement 38 is firmly embedded in the solidified portion of the glass ribbon 54 and thereby advances with the glass ribbon 54 under the action of the conveyor rollers 12 and the rollers of the lehr. The speed of advance of the reinforcement 38 on the guide face 14 of the water-cooled pocket 13 and the speed of penetration of the said reinforcement into the glass 35 are determined by the speed of the said solidified portion of the ribbon 54 in the lehr, which is adjustable as desired in a manner known per se.

The rollers 47, 48 are adjustable to exert tension of the reinforcement in accordance with the speed of advancement of the ribbon 54, whereby the reinforcement may be maintained substantially taut as it enters the glass for all speeds of advancement. In addition, by appropriate adjustment of the temperature of the glass 35 flowing over the sill or lower lip 1, sufficient viscosity is imparted to the glass 35 to enable it to be driven between the pocket 13, 14 and the lower roller 4 by the reinforcement 38, notably by the weft of the latter. Consequently, the speed of advance of the entire ribbon of reinforced cast glass is adjustable, including the portion being formed between 4, and 15, 16 by adjustment of the speed of the conveyor rollers.

Figure 2:
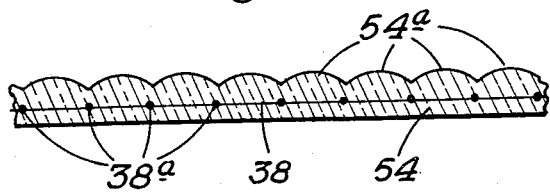
FIGURE 2 is a section through a reinforced cast glass ribbon obtained in accordance with the invention.

On the other hand, as a result of the high initial viscosity imparted to the glass 35, and of the rapid increase of this viscosity between the lower roller 4 and the pocket 13, 14, both of which are water-cooled, the introduction of the reinforcement 38 into the glass causes the latter to rise into each of the meshes of the reinforcement. There is thus formed above each mesh a small glass dome 54a (see FIGURE 2), the weft elements of the reinforcement 38 being denoted in FIGURE 2 at 38a. It will be seen that the reinforcement 38, 38a itself is entirely embedded in the mass of glass 54.

Since the glass 35, 54 is driven solely by the lower roller 4 and the weft of the reinfocement 38, the upper surface of the glass, forming the multitude of domes 54a above the meshes, retains its flash polish and thus retains a particular lustre.

The small domes 54a produce an optical effect similar to a multitude of abutting plano-convex lenses. When viewed from the convex side, the reinforcement is not visible, so that the observer sees from this side only the effect of the lenses.

By properly regulating the temperature at the surface of the glass mass as it overflows the lip 1, the viscosity and the degree of hardening of the glass and consequent engagement between the reinforcement and the glass can be controlled. The surface temperature of the glass is controlled by the roller 4 and pocket 13.

Upon initial entry of the reinforcement into the glass, the glass is sufficiently viscous to rise upwardly through the openings to form individual domes above the reinforcement. While the glass is hardening to encase and embed the reinforcement therein, the reinforcement is being driven by rollers 12 downstream which causes the hardening glass to advance with the reinforcement while causing the glass domes to blend together above the reinforcement to form the surface shown in FIGURE 2. It is important that no rolling or compressing forces be applied to the upper surface of the glass to distort the surface or effect the lustre thereof while the domes are blending together. The speed of immersion of the reinforcement into the glass is adjusted to the temperature of the glass core which latter temperature determines the viscosity of the glass.

The speed of immersion of the reinforcement into the glass is controlled by the tension in the reinforcement. The tension in the reinforcement is related to the advancing speed of the glass ribbon as carried by the roller 12 and the rollers in the lehr compared to the driving speed and pressure on the reinforcement caused by the rollers 47, 48.

By moving the pocket 13, 14 either towards the lehr or towards the furnace, it is possible to adjust the depth of penetration of the reinforcement 38 into the glass ribbon, so as to insure that the reinforcement is well embedded within the latter.

In addition, if the viscosity of the glass is appropriately adjusted, it is not necessary for the portions 15, 16 of the pocket 13, 14 to be in contact with the glass.

FIGURE 3 illustrates in simplified diagrammatic form a variant of an arrangement of this type. In accordance with this figure, the water-cooled pocket 13, 14 has been moved upstream of the roller 4, and the reinforcement 38 is directed along a line which is located a small distance beyond the periphery of the roller 4.

In this case, the thickness of the glass ribbon 54 is adjusted by adjusting the level of the molten glass 35 above the sill or upper lip 1, for example by means of the vertically movable gates 33, 34, (FIGURE 1). The thickness of the glass is also adjusted in accordance with the viscosity of the glass, or by automatic adjustment of the glass level by known methods.

In accordance with the modified construction illustrated in FIGURE 4, the pocket 13, 14 may be replaced by a roller 55 turning freely without any positive drive, the said roller 55 being water-cooled and situated outside the glass 35, so as to guide the reinforcement 38 in a manner similar to that described with reference to FIGURE 3.

It is obvious that both the pocket 13, 14 according to FIGURE 3 and the roller 55 according to FIGURE 4 may be mounted in adjustable manner as described in the embodiment illustrated in FIGURE 1.

The invention naturally includes many modified constructions differing from those hereinbefore described but which fall within the scope of the following claims.

What is claimed is:

1. A process for manufacturing reinforced cast glass ribbon comprising discharging molten glass from a container onto a roller, cooling the roller to reduce the surface temperature of the glass as it contacts the roller to cause solidifying of the glass, immersing an open mesh reinforcing element in the glass above the roller while feeding the mesh in a direction away from the container at a speed sufficient to allow upward flow of the solidifying glass through the open mesh of the reinforcing element and to allow the glass to solidify around the reinforcing element and form a lenticular surface, and advancing the solidifying glass in a direction away from said container by a force applied through the reinforcing element therein with the glass sufficiently viscous to avoid smoothing of the lenticular surface.

2. A process as claimed in claim 1 comprising placing said reinforcing element under stress as it is immersed into the glass.

3. A process as claimed in claim 1 comprising tensioning said reinforcing element by exerting a force on the solidified glass at said zone remote from the container.

References Cited in the file of this patent

UNITED STATES PATENTS

| 959,102 | Baldwin | May 24, 1910 |
|---|---|---|
| 1,217,614 | McCoy | Feb. 27, 1917 |
| 1,425,218 | Rowley | Aug. 8, 1922 |
| 1,541,638 | Gelstharp | June 9, 1925 |
| 1,818,207 | Drake | Aug. 11, 1931 |
| 1,856,630 | Gutmann | May 3, 1932 |
| 1,901,743 | Forster | Mar. 14, 1933 |
| 1,928,026 | Namesche | Sept. 26, 1933 |

FOREIGN PATENTS

| 306,424 | Italy | Mar. 20, 1933 |